(12) United States Patent
Begou et al.

(10) Patent No.: US 11,267,298 B2
(45) Date of Patent: Mar. 8, 2022

(54) DEVICE FOR EVALUATING THE DEFORMATION OF A PNEUMATIC TIRE CASING

(71) Applicant: COMPAGNIE GENERALE DES ETABLISSEMENTS MICHELIN, Clermont-Ferrand (FR)

(72) Inventors: Pierre-Alain Begou, Clermont-Ferrand (FR); Antoine Paturle, Clermont-Ferrand (FR); Jean-Michel Vacherand, Clermont-Ferrand (FR); Oussama Bouhadida, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 249 days.

(21) Appl. No.: 16/625,366

(22) PCT Filed: Jun. 4, 2018

(86) PCT No.: PCT/FR2018/051282
§ 371 (c)(1),
(2) Date: Dec. 20, 2019

(87) PCT Pub. No.: WO2018/234651
PCT Pub. Date: Dec. 27, 2018

(65) Prior Publication Data
US 2021/0331535 A1 Oct. 28, 2021

(30) Foreign Application Priority Data
Jun. 23, 2017 (FR) .................................. 1755767

(51) Int. Cl.
*B60C 23/04* (2006.01)
*B60C 19/00* (2006.01)
*B60C 23/06* (2006.01)

(52) U.S. Cl.
CPC ............ *B60C 23/064* (2013.01); *B60C 19/00* (2013.01); *B60C 2019/004* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS

| | | |
|---|---|---|
| 9,429,497 B2 | 8/2016 | Weston |
| 9,744,818 B2 | 8/2017 | Weston |

(Continued)

FOREIGN PATENT DOCUMENTS

| | | |
|---|---|---|
| CN | 104870223 A | 8/2015 |
| EP | 3031632 A1 | 6/2016 |

(Continued)

OTHER PUBLICATIONS

International Search Report dated Aug. 2, 2018, in corresponding PCT/FR2018/051282 (4 pages).

*Primary Examiner* — Andre J Allen
(74) *Attorney, Agent, or Firm* — Venable LLP

(57) ABSTRACT

A device valuates the deformation of a tire casing, the device including: a tire casing having a rotation axis, including a crown and having a radial stiffness; when said tire casing is included in a mounted assembly, the footprint of the tire casing has a dimension $L_{adc}$ in the axial direction; and an electronic device comprising one bending sensor, characterized in that the bending sensor includes an active part having a main dimension of between 10% and 80% of the dimension $L_{adc}$, in that the active part of the sensor is located in (Continued)

line with the crown, in that the main dimension of the active part is oriented in the circumferential direction of the tire casing and in that the bending sensor has a bending stiffness that is lower than the radial stiffness of the tire casing.

14 Claims, 5 Drawing Sheets

(58) Field of Classification Search
CPC . B60C 23/0433; B60C 23/0493; B60C 19/00; B60C 23/04; B60C 23/041; B60C 23/0411; B60C 23/20; B60C 23/0444; B60C 23/0462; B60C 11/24; B60C 23/064; B60C 23/007; B60C 23/0479; B60C 23/062; B60C 23/0401; B60C 23/0413; B60C 23/0488; B60C 23/043; B60C 23/06; B60C 23/0452; B60C 23/0467; B60C 11/246; B60C 23/0498; B60C 23/02; B60C 99/006; B60C 23/0428; B60C 23/0442; B60C 23/009; B60C 23/0425; B60C 2019/004; B60C 23/004; B60C 11/243; B60C 23/00354; B60C 23/045; B60C 23/0464; B60C 23/003; B60C 23/00318; B60C 23/0472; B60C 23/066; B60C 23/00372; B60C 23/0403; B60C 23/0406; B60C 29/02; B60C 11/00; B60C 23/006; B60C 23/044; B60C 23/00; B60C 23/0455; B60C 23/008; B60C 23/0454; B60C 23/0461; B60C 23/0415; B60C 23/0474; B60C 23/0489; B60C 23/0491; B60C 25/002; B60C 29/064; B60C 23/00363; B60C 23/0483; B60C 11/0318; B60C 23/0459; B60C 23/0471; B60C 23/0481; B60C 23/042; B60C 2019/005; B60C 23/002; B60C 23/0422; B60C 23/0423; B60C 23/0466; B60C 2200/02; B60C 23/0405; B60C 23/0477; B60C 29/06; B60C 13/001; B60C 23/0437; B60C 23/0476; B60C 25/132; B60C 23/0447; B60C 23/0427; B60C 23/0449; B60C 25/00; B60C 9/18; B60C 13/00; B60C 19/003; B60C 23/065; B60C 23/00336; B60C 23/0484; B60C 23/0486; B60C 23/08; B60C 17/00; B60C 2019/006; B60C 23/001; B60C 25/142; B60C 17/02; B60C 23/00345; B60C 23/0445; B60C 5/004; B60C 11/0083; B60C 25/145; B60C 29/00; B60C 9/02; B60C 11/0332; B60C 23/0418; B60C 23/0457; B60C 23/12; B60C 25/18; B60C 11/13; B60C 23/0469; B60C 23/04985; B60C 29/066; B60C 23/068; B60C 25/005; B60C 25/138; B60C 11/03; B60C 23/005; B60C 23/0432; B60C 3/00; B60C 5/14; B60C 99/00; B60C 11/11; B60C 17/04; B60C 17/06; B60C 23/063; B60C 23/10; B60C 25/007; B60C 25/0554; B60C 25/14; B60C 29/062; B60C 99/003; B60C 11/032; B60C 11/12; B60C 13/003; B60C 19/001; B60C 23/0435; B60C 23/127; B60C 23/16; B60C 29/068; B60C 3/04; B60C 9/20; B60C 11/01; B60C 11/0302; B60C 13/02; B60C 23/126; B60C 25/056; B60C 29/005; B60C 29/04; B60C 5/142; B60C 11/0304; B60C 11/0306; B60C 15/06; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/135; B60C 23/137; B60C 23/18; B60C 25/02; B60C 7/12; B60C 11/02; B60C 17/0009; B60C 19/002; B60C 19/08; B60C 19/12; B60C 2019/007; B60C 23/00347; B60C 23/131; B60C 25/05; B60C 5/001; B60C 5/22; B60C 1/0008; B60C 1/0016; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2011/0358; B60C 2011/1254; B60C 2017/068; B60C 2200/06; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/105; B60C 9/005; B60C 9/1807; B60C 9/28; B60C 2011/0033; B60C 23/085; B60C 25/0548; B60C 25/185; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/02; G01M 1/326; G01M 1/30; G01M 5/0058; G01M 1/26; G01M 17/0074; G01M 1/225; G01M 17/04; G01M 17/065; G01M 17/0072; G01M 17/10; G01M 7/00; G01M 1/16; G01M 99/00; G01M 7/08; G01M 1/34; G01M 17/028; G01M 17/045; G01M 3/3218; G01M 1/04; G01M 3/40; G01M 17/08; G01M 5/0091; G01M 1/365; G01M 13/04; G01M 17/03; G01M 5/0066; G01M 1/08; G01M 1/22; G01M 13/027; G01M 5/0033; G01M 1/00; G01M 1/122; G01M 15/044; G01M 3/24; G01M 3/2876; G01M 5/0075; G01M 1/06; G01M 1/12; G01M 1/24; G01M 1/32; G01M 1/36; G01M 11/081; G01M 13/023; G01M 13/025; G01M 17/00; G01M 17/0076; G01M 3/022; G01M 3/042; G01M 3/045; G01M 3/147; G01M 3/227; G01M 3/3236; G01M 5/0016; G01M 5/0025; G01M 5/0083; G01M 7/022; G01M 7/025; G01M 7/04; G01M 7/06; G01M 9/02; G01M 9/04; G01M 99/002; G01M 99/004; G01M 3/002; G01M 3/04; G01M 7/02; G01M 9/06
USPC .............................................. 73/146–146.8
See application file for complete search history.

(56) References Cited

U.S. PATENT DOCUMENTS 9,932,022 B2  4/2018  Weston
2004/0216520 A1* 11/2004  Caretta ............... B60R 25/1004
73/146

(56) References Cited

U.S. PATENT DOCUMENTS

2014/0326062 A1   11/2014  Weston
2015/0328942 A1   11/2015  Weston
2016/0264109 A1    9/2016  Weston

FOREIGN PATENT DOCUMENTS

WO    2013/101064 A1   7/2013
WO    2015/073015 A1   5/2015

* cited by examiner

DEVICE FOR EVALUATING THE DEFORMATION OF A PNEUMATIC TIRE CASING

FIELD OF THE INVENTION

The present invention relates to a device for evaluating the deformation of a tyre casing when the latter included in a mounted assembly rolls over a ground.

TECHNOLOGICAL BACKGROUND

It is essential to focus on the interaction between the tyre casing and the ground. Indeed, the tyre casing is the first element of the vehicle in direct contact with the ground. The first element is involved predominantly in the guiding, braking and grip functions of the vehicle. It is an indisputable safety element of the vehicle. For many years, electronic devices referred to as TPMS (tyre pressure monitoring system) have been inserted at the mounted assembly in order to detect variations in usage parameters of the mounted assembly that can lead to a malfunction of the vehicle such as the inflation pressure or the temperature of the fluid cavity of the mounted assembly included between the tyre casing and the wheel rim. In recent years, additional parameters have been monitored via new electronic devices called a TMS (tyre mounted sensor). These new parameters focus on the actual geometry of the contact zone between the tyre casing and the ground, with the objective then being to optimize the safety systems of the vehicle such as the anti-lock braking system referred to as ABS (German acronym for Antiblockiersystem) or systems for stabilizing the vehicle or ESP (electronic stability program) stabilizer.

The measurement, or the payload, from these sensors results directly from the deformation to which the tyre casing is subjected due to the contact thereof with the ground. Indeed, the tyre casing that is initially toroidal will deform in the zone of contact with the ground called contact area when the ground is stiff. The information on the deformation of the casing is an indicator of the level of interaction between the tyre casing and the ground.

Among the envisaged sensors, EP3031632A2 uses a movement detector in order to indirectly identify the circumferential azimuths of the tyre corresponding to the entry and the exit of the contact area. Thus, an evaluation of the length of the contact area is carried out, produced from measuring the angle between two localized and separate points. Other sensors such as accelerometers use the variation in the radial acceleration as an indicator of this change of geometry. The main disadvantage of such sensors is the selective nature of the measurement. Thus, if the sensor is located in line with or in proximity to a stiffness irregularity, whether it is geometric like a pothole or structural like a pebble in soft ground, the performed measurement is affected by a significant error compared to a continuous measurement. Likewise, this irregularity can be located at the ground or at the tyre casing. Indeed, the crown of the tyre casing includes a tread which can be made up of a sequence of longitudinal or transverse hollows and of projecting sculptures making the local stiffness of the tyre casing in contact with the ground highly heterogeneous. Moreover, these systems have an impact on the local stiffness of the tyre casing on which they are mounted thus disrupting the true deformation of the tyre casing. Finally, a measurement taking into account the transverse heterogeneities of the tyre casing at the crown would make the measurement system more reliable.

The aim of the invention is to propose a technical solution making it possible to obtain a measurement of the deformation of the tyre casing in respect of the contact area during the contact thereof with the ground.

Technical Definitions

The description hereafter contains terms with the following meanings:
"axial direction", the advancing direction of the tyre casing in the fixed reference system,
"vertical direction", the direction in the fixed reference system according to the normal line with respect to the ground,
"transverse direction", the direction forming a right-handed trihedron with the vertical and axial directions,
"mounted assembly", device including at least one tyre casing and one wheel made up of a disk and of a rim in a mounted and inflated state,
"radial direction", the direction of the rotating reference system linked to the tyre casing moving away from the rotation axis of the tyre casing,
"circumferential direction", the direction of the rotating reference system forming a right-handed trihedron with the transverse and radial directions,
"mid-plane of the tyre casing", imaginary plane, perpendicular to the rotation axis of the tyre casing separating the latter into two equally divided parts.

DESCRIPTION OF THE INVENTION

The invention relates firstly to a device for evaluating the deformation of a tyre casing which includes:
a tyre casing having a rotation axis, including a crown and two sidewalls ending with two grip zones, having a radial stiffness;
when the tyre casing is included in a mounted assembly in a nominal condition of use, the footprint of the tyre casing has a dimension $L_{adc}$ in the axial direction and an electronic device comprising at least one bending sensor.

The evaluating device is characterized in that the bending sensor includes an active part having a main dimension of between 10% and 80% of the dimension $L_{adc}$. Moreover, the evaluating device is characterized in that the active part of the sensor is located in line with the crown and in that the main dimension of the active part is oriented in the circumferential direction of the tyre casing. Finally, the evaluating device is characterized in that the at least one bending sensor has a bending stiffness that is lower than the radial stiffness $k_{radial}$ of the tyre casing.

The term "radial stiffness of the tyre casing" in this case means the bending stiffness of the tyre casing according to a radial stress of the crown block in a state of being mounted and inflated on a rigid wheel.

The term "nominal condition of use" means the conditions of applied load and of inflation pressure according to the ETRTO standard depending on the dimensions of the tyre casing. Under these conditions, with a rigid wheel on a stiff and planar ground, the tyre casing describes a contact surface with the ground in a static condition called a contact area. The maximum axial distance is called $L_{adc}$ and the maximum transverse distance is called $l_{adc}$.

The term "bending sensor" in this case means that the sensor delivers a signal proportional to the average bending applied in the main direction thereof. Due to defining an active part of this bending sensor having a certain dimension, at each measurement the average bending of the active part of the bending sensor is evaluated.

This type of device addresses the technical problem since it makes it possible to identify the overall change in curvature which will take place at an angular sector of the tyre casing between the times when this angular sector is located entirely in the contact area or completely outside the contact area. This device only attempts to identify the resulting bending of an angular section corresponding to a length between 10% and 80% of the $L_{adc}$ of the tyre casing provided with the sensor between a first state in contact with the ground and a second state outside the contact with the ground. Indeed, when the contact area is crossed, the sensor will be, for example, on stiff ground like an asphalt surface, in a planar form which is different to the curved form when the sensor is completely outside the contact area. Finally, the sensor is more flexible than the radial stiffness of the tyre casing in the condition of use. Thus, the sensor does not excessively modify the deformability of the tyre casing and consequently the geometry of the contact area.

Preferentially, the at least one bending sensor is sensitive to bending between 0 and 60 degrees.

Due to the dimension of the active part of the bending sensor and the conventional curvature of a tyre casing, a precise response of the sensor is desired for angles of curvature between 0 and 60 degrees which will be the angular range to be measured in the condition of use on a tyre casing.

According to an advantageous embodiment, wherein, with the footprint of the tyre casing included in a mounted assembly under nominal conditions of use having a dimension $l_{adc}$ in the transverse direction, the electronic device has a measurement zone which extends transversally over a distance of between 10% and 80% of the dimension $l_{adc}$ of the contact area.

Thus, the deformability of the tyre casing is completely evaluated in the axial direction while taking into account the diversity in the transverse direction. Firstly, this makes it possible to take into account localized irregularities of the ground over a large part of the surface of the contact area. Thus, a stiffness irregularity in the ground, such as, for example, a pebble in soft ground, will be averaged out on the final signal. This improves the quality of the signal from the sensor by making it less dependent upon the these localized irregularities. As a result, transversally extending the measuring zone of the electronic device makes it possible to overcome these difficulties. This extension can be achieved firstly using a single sensor having a two-dimensional surface or secondly using several linear sensors positioned transversally beside one another.

Preferentially, since the active part of the at least one bending sensor is on a surface shape, the surface shape is from the group including square, rectangular, parallelogram, oblong, circular, oval and elliptical.

These specific shapes make it possible to have both a sensor that has a linear or surface shape. Moreover, these shapes make it possible to adjust to the geometric specifics of the tread of the crown of the tyre casing.

According to a preferential embodiment, the active part of the at least one bending sensor is located in line with a zone of the crown of the radial stiffness material homogenous tyre casing.

To improve the quality of the curvature measurements, it is preferable for the active part of the sensor to be positioned in line with a homogenous zone of the tread. Thus, only the information from the nature of the ground will be visible to the bending sensor. The measurement is therefore of better quality and the utilization thereof is immediate.

According to an extremely preferential embodiment, the active part of the at least one bending sensor is located in line with a sculpture element of a tread of the crown of the tyre casing.

To increase the signal-to-noise ratio of the sensor, it is preferable to position the latter in line with a sculpture element which will be in direct contact with the ground. Thus, the deformation of the tyre casing generated by the ground is at a maximum in line with this element.

Preferentially, the active part of the at least one bending sensor is centered transversally with respect to the crown of the tyre casing.

Likewise, to optimize the signal sensed by the sensor, it is advisable to position it in the transverse direction at the center of the crown of the tyre casing. Indeed, it is at this location that the deformation of the tyre casing is at a maximum under the condition of driving in a straight line which is the most probable driving condition.

According to another embodiment, the electronic device is located radially inwardly with respect to the crown of the tyre casing.

In this configuration, at least part of the electronic device is positioned inside the tyre casing. As a result, the positioning of at least part of the device can take place after the manufacture of the tyre casing which makes the operation less tricky as regards the components of the electronic device. Moreover, when there is an incident on the electronic device, it is always possible to intervene without destroying the tyre casing which is significant. Finally, when the tyre casing is at end of life, it will also be easy to remove the at least one part of the electronic device in order to reuse it on another tyre casing.

According to another preferential embodiment, the active part of the at least one bending sensor has an external surface connected to the radially interior surface of the crown of the tyre casing.

The bending sensor is located outside the tyre casing under special circumstances. For the sensor to provide information that is as reliable as possible with respect to the deformation of the tyre casing, it is preferable for the active part of this sensor to be closely connected to the interior surface of the crown block. For this purpose, standard means of grip specific to grip on rubber will be used, according to the nature of the external surface of the active part. Thus, the complete electronic device is generally located outside the structure of the tyre casing making it possible to fit it completely after the manufacture of the tyre casing.

According to a preferential embodiment, the at least one bending sensor is a passive and resistive sensor.

This type of sensor makes it possible to obtain the average curvature of the tyre casing over a substantial angular sector in a rather linear way although it is possible to increase the number of sensors in order to transversally cover the contact area. The deformation of the tyre casing causes the sensor to bend which results in a variation of the resistance of the sensor. This variation of the impedance of the sensor is proportional to the degree of bending of the tyre casing.

According to another preferential embodiment, the at least one bending sensor is an active and piezoelectric sensor.

This is another type of sensor that is sensitive to the bending of the tyre casing and which is well suited to active parts having a surface shape. The signal transmitted by the sensor, in this case a variation of load, is proportional to the curvature of the active part of the sensor.

According to a specific embodiment, the electronic device includes at least one sensor for measuring the parameters of the mounted assembly from the group including a temperature sensor, a pressure sensor and an accelerometer.

It is completely possible to couple the bending sensor with other measuring sensors. In particular, sensors similar to the electronic devices for monitoring the parameters of the contact area like a temperature sensor or a pressure sensor. These measurements of the parameters of use of a mounted assembly that are combined with the measurement of deformation of the tyre casing make it possible to access additional information of the mounted assembly in order to detect a puncture or an excess load applied to the mounted assembly. Finally, the placing of the electronic device on the crown block is a preferred location for linking the electronic device to accelerometric sensors.

According to another specific embodiment, the electronic device includes at least one radiofrequency transmitting device.

If the original aim of the electronic device is to measure the deformation of the tyre casing, it is also necessary to send this information to other safety devices of the mounted assembly. These safety devices are located either in the mounted assembly such as the TPMS or TMS or on the vehicle. Consequently, this radiofrequency transmitting device includes a receiving module and the suitable antenna thereof which operate over the free radiofrequency frequencies of UHF (ultra high frequency) type for sending data and LF (low frequency) type for waking the safety devices.

According to a second specific embodiment, the electronic device includes at least one radiofrequency receiving device.

Another configuration is that in which the electronic device is equipped with a radiofrequency receiving device. In this case, the electronic device receives additional information either from the TPMS- or TMS-type safety devices or from interrogators coming from the vehicle or the passengers in order to carry out a task like waking the electronic device, storing measurements or sending a block of measurements.

BRIEF DESCRIPTION OF THE DRAWINGS

The invention will be better understood upon reading the following description given solely by way of example and with reference to the appended figures wherein the same reference numbers designate, throughout, identical parts and wherein.

DETAILED DESCRIPTION OF EMBODIMENTS

Figure 1:
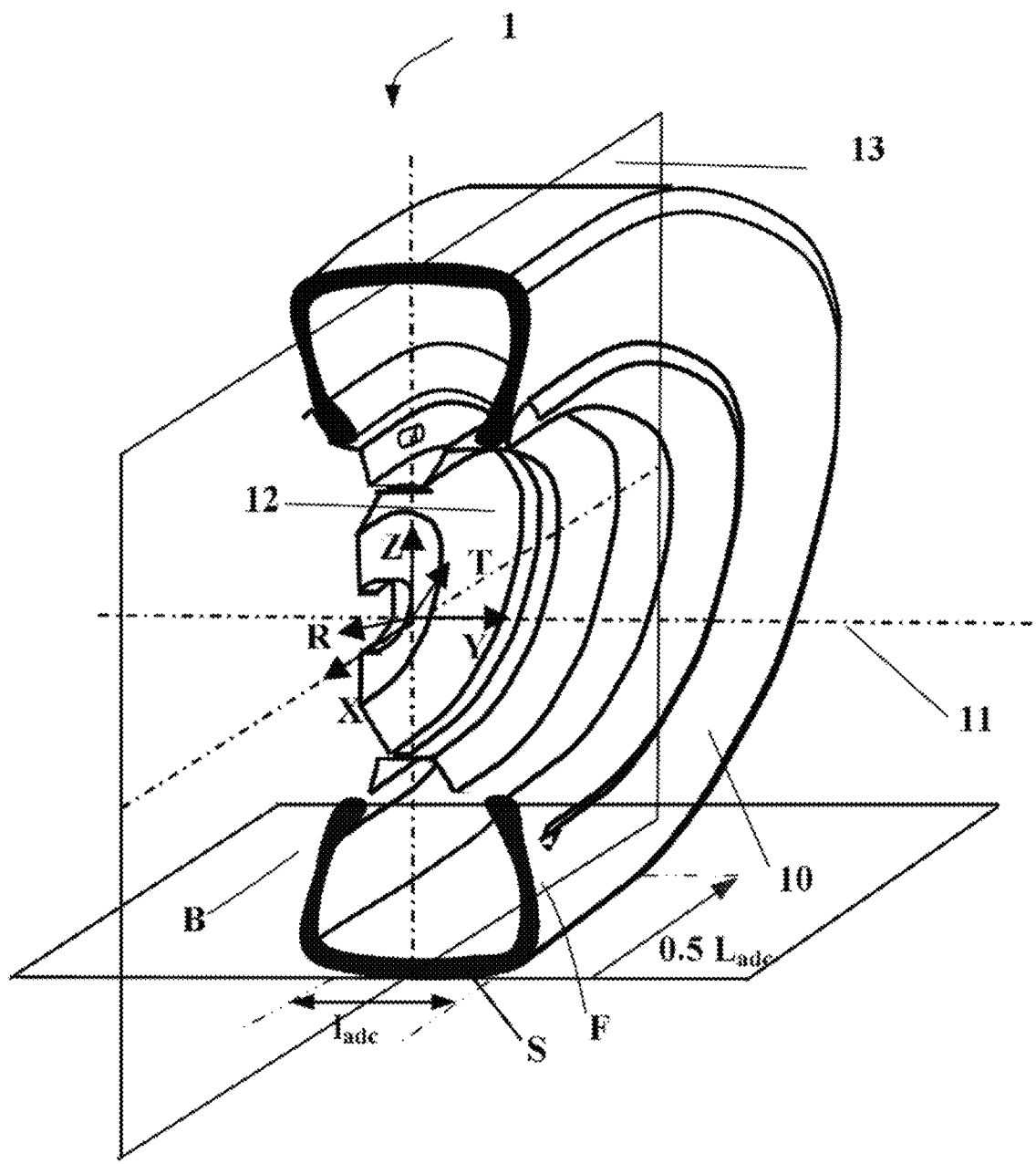
FIG. 1 shows a perspective and radial section view of a tyre casing which is part of the device for evaluating the deformation of a tyre casing.

FIG. 1 shows a device 1 for evaluating the deformation of a tyre casing including a tyre casing 10 and a wheel 12. It also includes an electronic device located inside the tyre casing 10, which electronic device is not represented in this figure. The mounted assembly is provided with a first fixed reference system. The origin of the reference system is the center of the tyre casing 10 defined by the intersection of the rotation axis 11 of the tyre casing 10 and of the mid-plane 13 of the tyre casing 10. The axial axis designated as X is in the direction of movement of the tyre casing 10 on the ground under straight-line driving conditions. The vertical axis designated as Z is along the normal line to the ground. Finally, the transverse axis Y is directed along the rotation axis 11 of the tyre casing 10 under straight-line driving conditions. The second reference system associated with the tyre casing 10 is a rotating reference system. The origin of the reference system and the transverse axis Y are identical to those of the fixed reference system. However, it is provided with a radial axis designated as R which moves radially away from the rotation axis 11 and with a circumferential axis designated as T forming a right-handed trihedron with the transverse axis Y and the radial axis R.

The tyre casing 10 of passenger vehicle- and van-type, of 205/55R16 91 V size for example, includes a crown designated as S being continued by two sidewalls designated as F ending with zones for grip, designated as B, on the rim of the wheel 12. This smooth-type tyre casing is in the mounted condition on a steel wheel 12, of size 6.5 J16 and with a 20 millimeter offset. The mounted assembly is inflated to the nominal pressure of use of 2.1 bar. It is subjected to a nominal load of 400 kilograms on a planar and stiff ground. The footprint of the tyre casing 10 defines a contact area. This contact area is inscribed in a rectangle, the sides of which are parallel in pairs to the axial axis X and the transverse axis Y, respectively. The dimension in the direction X defines the length of the contact area designated as $L_{adc}$. The dimension in the direction Y defines the width of this contact area designated as $l_{adc}$.

Figure 2A:
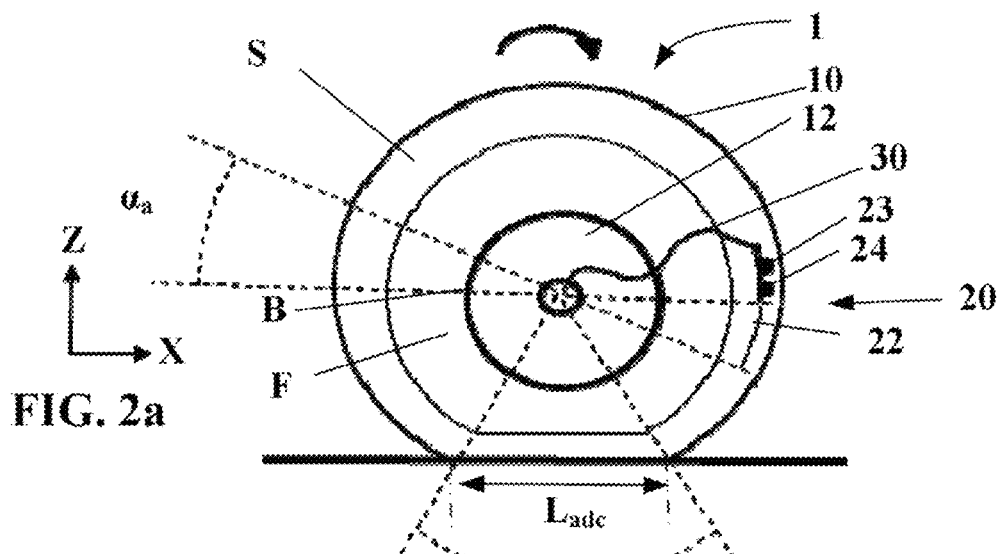
FIGS. 2a, 2b, 2c represent meridian section views of a device for evaluating a tyre casing, with the installation of the electronic device thereof changing radially.
Figure 2B:
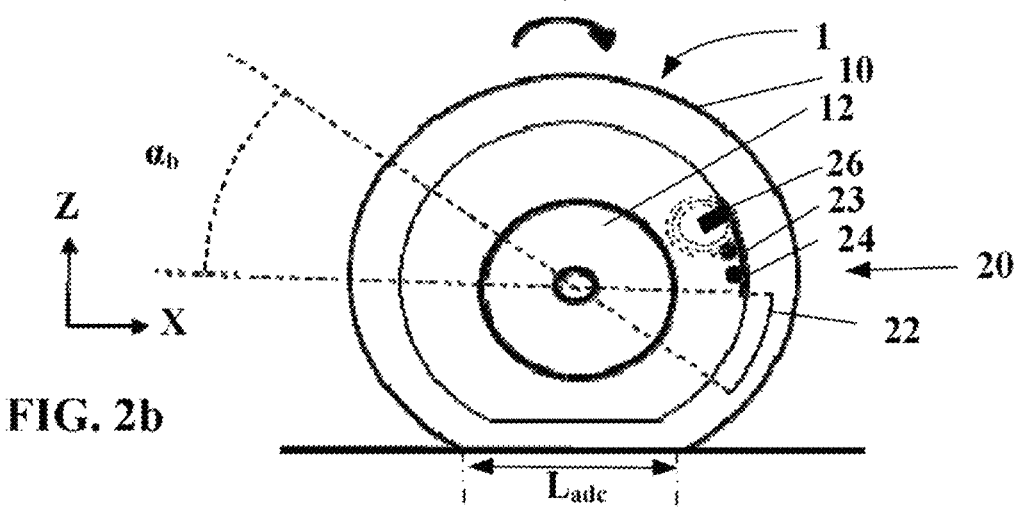
Figure 2C:
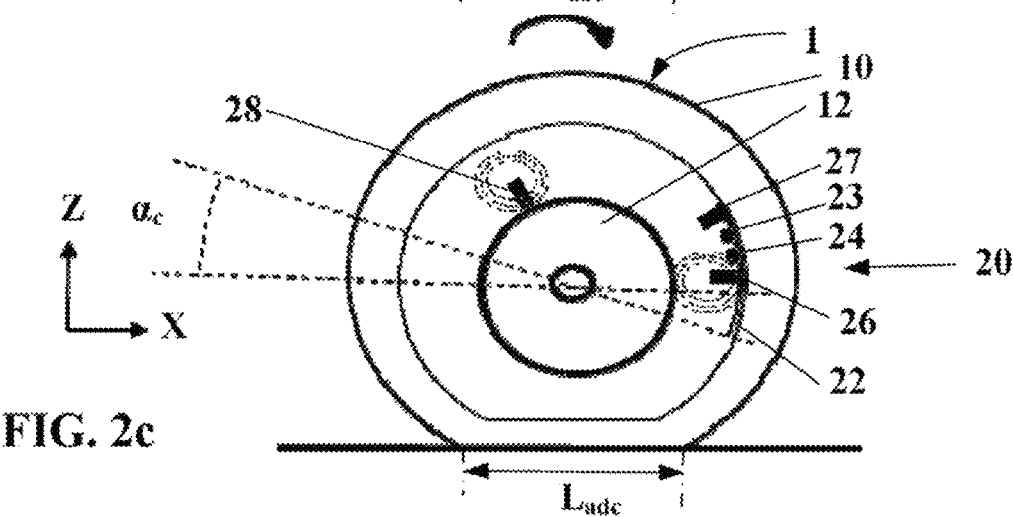

FIGS. 2a, 2b, 2c are meridian section views of a tyre casing 10 mounted on a wheel 12. Each view shows a nonlimiting example of installation of an electronic device 20 in a device 1 for evaluating the deformation of the tyre casing.

In FIG. 2a, the electronic device 20 includes a bending sensor represented by the active part 22 thereof, a control module 23 and a battery 24 which are connected galvanically to one another by means of an electronic board. A wired link 30 between the control module 23 and an external device located outside the mounted assembly passes through a slip ring. This wired link 30 transmits the measurements in real time to the external device. In this configuration, the electronic device 20 is buried inside the crown S of the tyre casing 10 where only the wired connections 30 to the external device are located outside the tyre casing 10.

In FIG. 2b, the electronic device 20 includes the same elements as in FIG. 2a. However, a radiofrequency transmitting device 26 is galvanically connected to the control module 23. Thus, the sending of the data between the electronic device 20 and the external device is via a radiofrequency communication in the UHF range and more particularly over the following free transmission frequencies 433 MHz, 860 MHz or 920 MHz. Moreover, the electronic device 20 in this case includes a sensor for measuring the parameters of the mounted assembly of pressure sensor-type which is not represented in FIG. 2b. The latter is connected galvanically to the control module 23 via the electronic board. In this configuration, the active part 22 of the bending sensor is located inside the crown block S. However, the non-active part of the bending sensor, the control module 23, the battery 24, the sensor for measuring the parameters of the mounted assembly and the radiofrequency transmitting device 26 are fixed on the interior surface of the crown S. Thus, the active part 21 is protected inside the tyre casing 10 whereas the other components can be easily exchanged over the life of the evaluating device 1.

In FIG. 2c, the electronic device 20 does not include a sensor for measuring the parameters of the mounted assembly connected galvanically to the control module. By contrast, the mounted assembly is equipped with a safety device of TMS- or TPMS-type having this type of sensor 28. Furthermore, the electronic device 20 includes a radiofrequency receiving device 27. The radiofrequency receiving module 27 is then suitable for listening to the signals transmitted by the safety device in order to retrieve the information regarding the parameters of the mounted assembly that are coming from the sensor 28. The electronic device 20 then sends, by means of radiofrequency, the information from the bending sensor and from the sensor for measuring the parameters of the mounted assembly 28 to a device external to the mounted assembly.

In another configuration, not represented in this case, the electronic device 20 includes all of the elements of the electronic device 20 of FIG. 2b. Moreover, a radiofrequency receiving module 27 is connected galvanically to the control module 23. Thus, the radiofrequency receiving module 27 has the function, in this configuration, of activating the electronic device 20 upon receiving an order originating from the driver or the vehicle sent by radiocommunication over the frequency of 125 kHz. In the absence of this order, the electronic device 20 is in standby mode making it possible to conserve the battery 24. When the electronic device 20 is activated, it launches the acquisition of the data over a predetermined period of time corresponding to several wheel rotations.

In the assembly of FIGS. 2a, 2b and 2c, it will be noted that the active part 22 of the bending sensor covers angular sectors $\alpha_a$, $\alpha_b$ and $\alpha_c$ which represent 20%, 50% and 10%, respectively, of the length $L_{adc}$ of the contact area defined by the angular sector $\beta$. It will be observed that the other components of the electronic device 20 are not necessarily located in line with the active part 22 of the bending sensor. Indeed, they are positioned in an angular sector in the rotating reference system and lagging with respect to the advancing direction of the tyre casing 10. Thus, these components barely modify the radial stiffness of the tyre casing 10 in line with the active part 22 of the bending sensor.

Figure 3A:
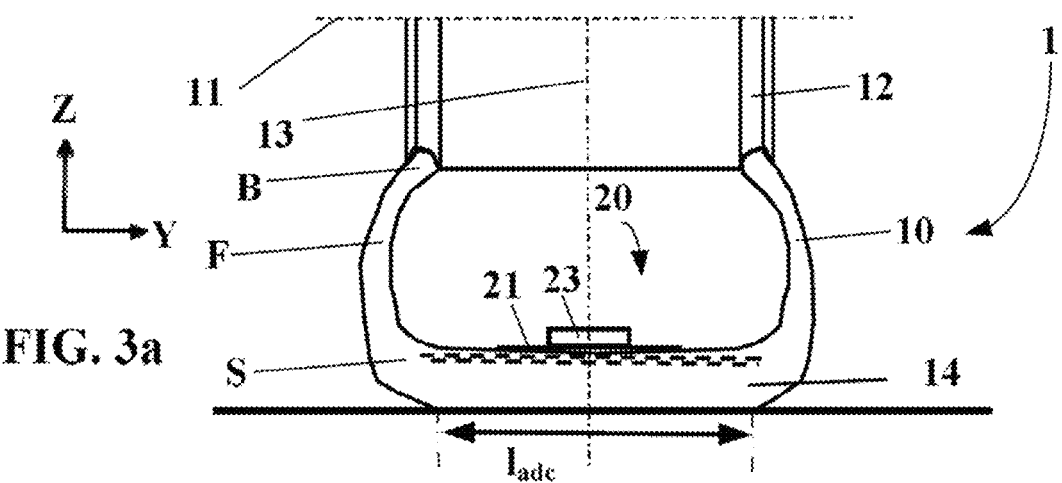
FIGS. 3a, 3b and 3c show radial section views of a device for evaluating the deformation of a tyre casing, with the installation of the electronic device thereof changing transversally.
Figure 3B:
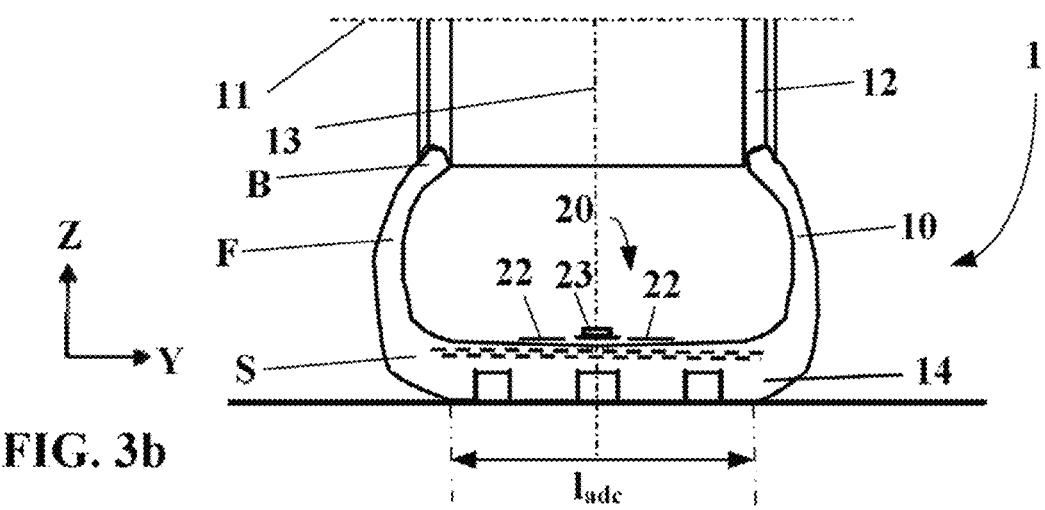
Figure 3C:
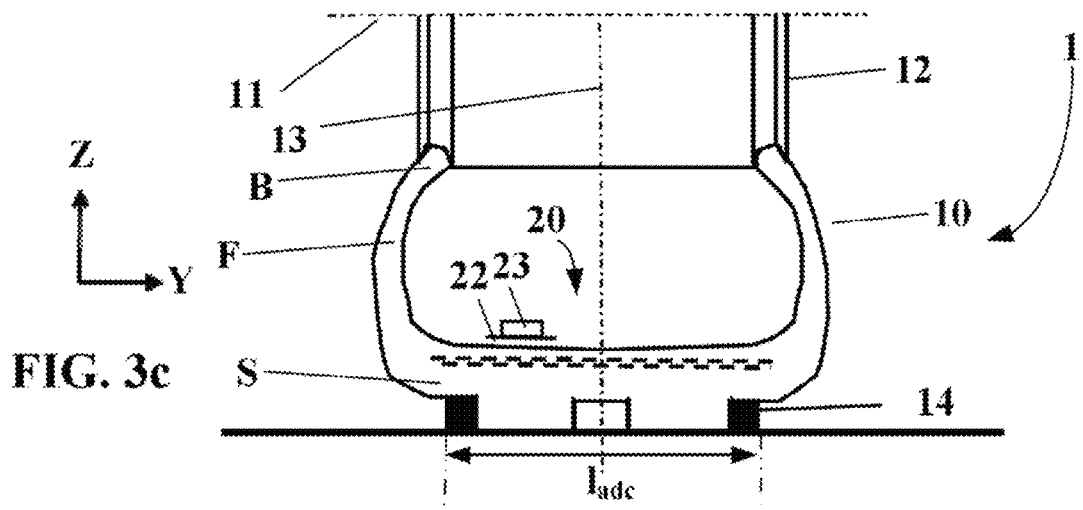

FIGS. 3a, 3b and 3c present various nonlimiting transverse installations of the electronic device 20 in a device 1 for evaluating the deformation of the tyre casing. In these figures, the electronic device 20 of the evaluating device 1 is positioned outside the structure of the tyre casing 10 and radially inwardly with respect to the tyre casing 10 mounted on a wheel 12 and having a rotation axis 11 and mid-plane 13. The tread 14 of the crown S of the tyre casing 10 defining, in the nominal condition of use, a contact area is characterized furthermore by the width $l_{adc}$.

FIG. 3a shows an evaluating device 1 in the instance of a tyre casing 10 having no hollows or projecting elements on the tread 14 of the crown S, and the tyre casing 10 is smooth. In this specific case, the active part of the bending sensor 21 of the electronic device 20 is centered transversally with respect to the width of the crown S although a transverse shift would be possible without greatly modifying the response of the bending sensor 21. Moreover, the width of the active part of the sensor 21 represents 60% of the dimension of the width $l_{adc}$ of the contact area making it possible to average out the response of the tyre casing 10.

FIG. 3b shows a tyre casing 10 of ribbed-type having three circumferential furrows 16a, 16b and 16c which are equidistant with respect to one another. The central furrow 16b is centered on the width of the crown S. In this case, the active part 22 of the bending sensors is located in line with a circumferential rib which is a radial stiffness material homogenous zone. Since the width of the rib is small, the electronic device 20 in this case includes two linear bending sensors, i.e. narrow transversally, located in line with the central ribs. The measuring zone of the electronic device 20 extends transversally over 40% of the width $l_{adc}$ of the contact area by means of two measuring zones extending individually over 10% of the dimension $l_{adc}$. In this specific case, the other components of the electronic device 20 are located between the active parts 22 of each bending sensor. Indeed, this is a zone of little interest for the measurement since it is not directly subject to the stiffness of the ground over which the mounted assembly rolls.

FIG. 3c is a configuration where the tread 14 of the crown S of the tyre casing 10 has wide sculptures each representing approximately 30% of the dimension $l_{adc}$ in a banana shape starting from the center of the width $l_{adc}$ of the crown S and extending transversally in a direction of 45 degrees with respect to the axis X. The combination of a banana-type sculpture moving away in the positive transverse direction and of another moving away in the negative transverse direction forms a chevron. The tyre casing in this case includes 20 chevrons equally distributed over a wheel turn. The active part 22 of the bending sensor is positioned in line with one of these sculptures over a width of 15% of the dimension $l_{adc}$. Moreover, the transverse position of this bending sensor is centered with respect to the transverse dimension of the banana sculpture. In this radial section, the grey zone represents the transversally exterior part of the banana structure.

Thus, in the FIGS. 3a, 3b and 3c, the active part 22 of the bending sensor is positioned in line with a radial stiffness material homogenous zone of the tyre casing 10.

Figure 4:
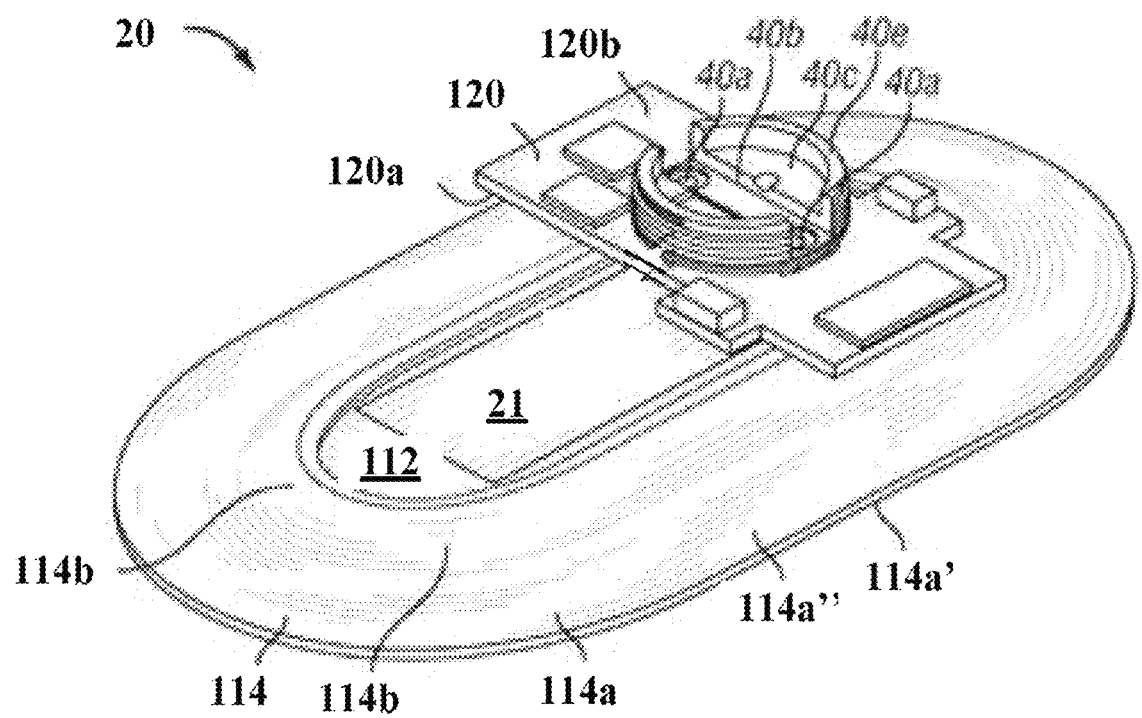
FIG. 4 shows a perspective view of a device for evaluating the deformation of a tyre casing including a piezoelectric-type bending sensor.

FIG. 4 is a perspective view of an electronic device 20 including a piezoelectric-type bending sensor 21 that can be fitted on the internal surface of a tyre casing. This electronic device 20 includes a holding patch 114 made of elastomeric material, the first functionality of which is to hold the piezoelectric bending sensor 21. The other functionality of this patch 114 is to fix the electronic device 20 on the internal surface of a tyre casing. For this purpose, the patch has a lower closed surface 114a' for connection to the tyre casing. Chemical means of grip that are well known to a person skilled in the art are then used to fix this surface 114a' to the tyre casing. These means are chemically compatible with the elastomers both of the tyre casing and of the patch 114.

The upper surface 114a" of the holding patch 114 has a tapered annular structure 114a with proximity to the ends of the patch 114 and a bulging annular structure 114b connected to the tapered structure 114a toward the center of the patch 114. This bulging structure 114b forms, with the lower structure 114a', a slit that can receive and hold the bending sensor 21 by means of an intermediate piece 112.

The piezoelectric element 21 is, in this case, integrated into the intermediate piece 112 at the ends thereof. The intermediate element 112 is rigidly connected to the patch 114. The active part of the piezoelectric element 21 delivers an electric signal which can be analyzed and which is proportional to the bending of the patch 114. A printed circuit 120 including various components on the upper face 120b thereof such as a control module, a sensor for measuring pressure, is mounted on the intermediate piece 112. The printed circuit 120 furthermore includes a base 40 that can receive a rechargeable battery. This battery is recharged using a second piezoelectric element not represented in this figure.

The piezoelectric element 21 is made up of a sandwich structure including a piezoelectric layer between two conductive layers. The material of the piezoelectric layer includes at least one element from the group including berlinite, quartz, topaz, ivory, gallium, titanate, zirconate titanate, potassium niobate, lithium niobate, sodium niobate, lithium tantalite and polyvinylidene fluoride (PVDF). The conductive layers are made up by conductive materials of copper, gold, silver, aluminium or equivalent type.

Of course, other types of bending sensor can be used, in particular resistive sensors, the impedance of which is proportional to the bending of the active part of the sensor. This type of sensors has different active part lengths and sensitivities changing according to the dimension. Sensors of the Spectra Symbol brand having the FS-L-0095-103-ST or FS-L-0055-253-ST references are completely suitable for this type of device.

Figure 5:
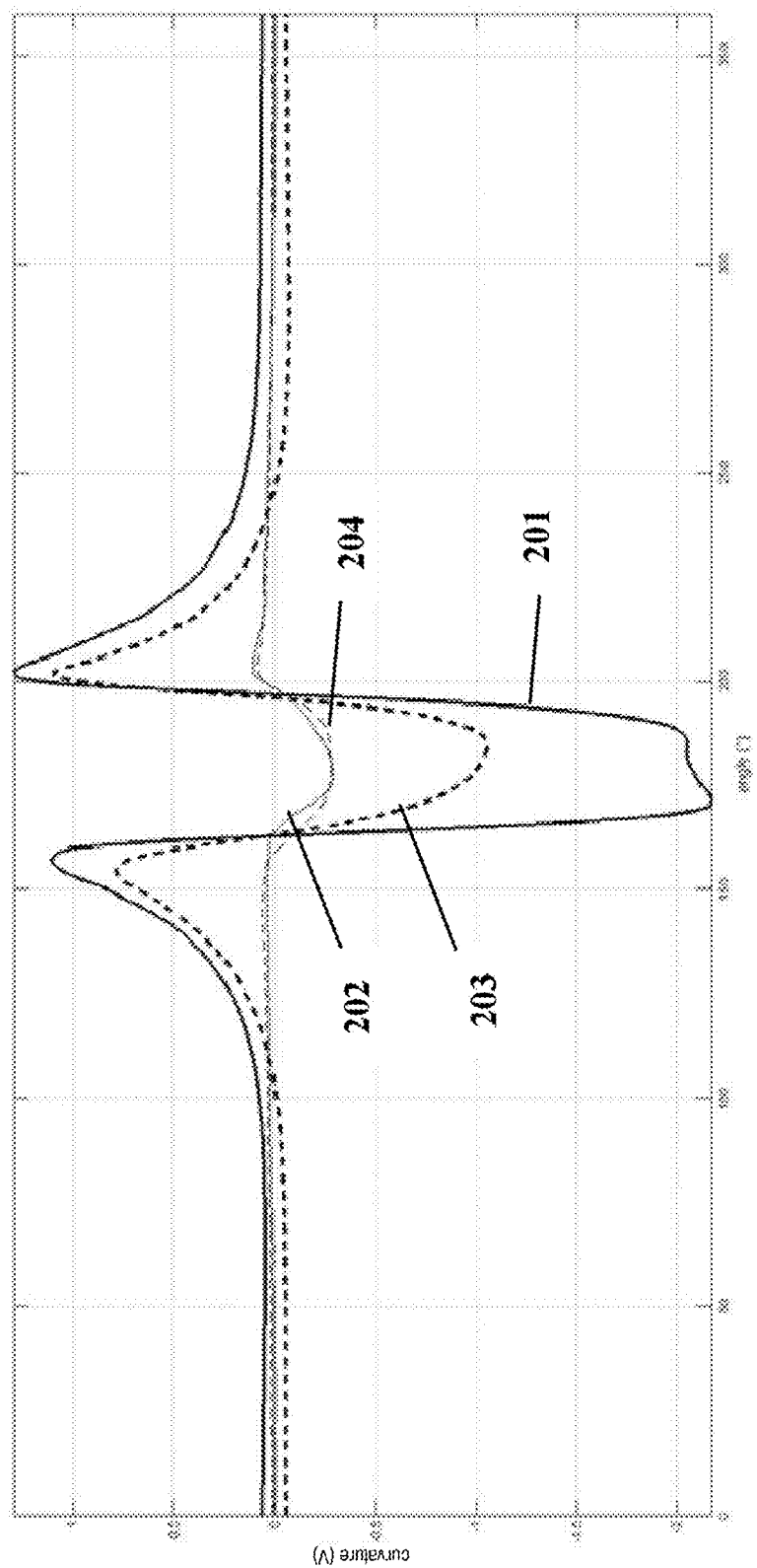
FIG. 5 shows the response of bending sensors according to various installation positions and according to degrees of different deformability of the tyre casing.

FIG. 5 comprises the responses of bending sensors of piezoelectric-type when the latter are fitted on a tyre casing of Michelin Multibib brand of 650/60 R38 size when rolling on a Fendt Turbomatik Favorit 614 LSA tractor. This tyre casing has two series of bars positioned on the lateral parts of the tread angularly offset with respect to each other. Indeed, each bar starts from the center of the crown and extends in a direction of 30 degrees toward the exterior.

A first bending sensor is positioned on the interior rubber of the tyre casing while having the sensor active part fixed in line with a bar. To optimize the response of the signal, this bending sensor is located as centrally as possible on the tread. A second bending sensor is positioned in line with an inter-bar zone. This sensor is also centered as best as possible with respect to the width of the crown.

These devices for evaluating the deformation of the tyre casing will roll over two grounds of different stiffness. The first ground is a high stiffness bituminized road. The second ground is an agricultural field that is cropless and unploughed for some time. Thus, the deformation experienced by the tyre casing between the two zones is different, and the bending sensor is expected to be able to recreate these phenomena.

The mounted assembly is inflated to the pressure of 1.6 bar and the tractor drives at a constant speed of 10 km/h both on the road and in the field.

The curves 201 and 203 in bold represent the response of the first bending sensor, the active part of which is located in line with a bar of the tread. The curves 202 and 204 in thin line are the responses of the second bending sensor located in the inter-bar zone. The curves 201 and 202 in continuous line correspond to driving on the road, whereas the curves 203 and 204 in dotted line correspond to driving in the field.

The observed signals are the average over 10 wheel turns of the raw output of the bending sensor in volts for one complete wheel turn, and this is therefore an indirect measurement of the bending of the sensor since the observed response of the piezoelectric sensor is, in this case, a voltage, proportional to the variation in bending and not directly the absolute bending of the sensor. The origin of the angles is located in the vertical direction, according to the positive Zs in the fixed reference system. The dramatic change located around 180 degrees corresponds to the response of the sensor in the contact area.

It is quite clearly observed that the response of the first bending sensor is correct as regards expectation. Furthermore, a dramatic change in the response thereof which is proportional to the stiffness of the ground and therefore to the deformation of the tyre casing is seen. By contrast, the response of the second sensor is not sufficiently discriminatory. Firstly, the amplitude of the response of the second bending sensor is clearly less than that of the first sensor. Moreover, the response of the second sensor is virtually similar and this is regardless of the nature of the ground. As a result, it becomes clear that the positioning of the sensor in line with a sculpture element in contact with the ground is preferable for optimal operation of the device for evaluating the deformation of the tyre casing. However, the two sensors give reliable information as regards the geometry of the contact area which is also an important and essential criterion in evaluating the deformation of the tyre casing.

The invention claimed is:

1. A device for evaluating the deformation of a tire casing comprising:
   the tire casing having a rotation axis, including a crown and two sidewalls ending with two grip zones, and having a radial stiffness $k_{radial}$ and a footprint of the tire casing having a dimension $L_{adc}$ in the axial direction when the tire casing is included in a mounted assembly in a nominal condition of use; and
   an electronic device comprising at least one bending sensor,
   wherein the at least one bending sensor includes an active part having a main dimension of between 10% and 80% of the dimension $L_{adc}$,
   wherein the active part of the at least one bending sensor is located in line with the crown,
   wherein a main dimension of the active part is oriented in a circumferential direction of the tire casing, and
   wherein the at least one bending sensor has a bending stiffness that is lower than the radial stiffness $k_{radial}$ of the tire casing.

2. The device according to claim 1, wherein the at least one bending sensor is sensitive to bending of between 0 and 60 degrees.

3. The device according to claim 1, wherein the footprint of the tire casing included in the mounted assembly under nominal conditions of use has a dimension $l_{adc}$ in the transverse direction, and the electronic device has a measurement zone which extends transversally over a distance of between 10% and 80% of the dimension $l_{adc}$.

4. The device according to claim 1, wherein the active part of the at least one bending sensor is on a surface shape, and the surface shape is selected from the group consisting of square, rectangular, parallelogram, oblong, circular, oval and elliptical.

5. The device according to claim 1, wherein the active part of the at least one bending sensor is located in line with a zone of the crown of the radial stiffness material homogenous tire casing.

6. The device according to claim 1, wherein the active part of the at least one bending sensor is located in line with a sculpture element of a tread of the crown of the tire casing.

7. The device according to claim 1, wherein the active part of the at least one bending sensor is centered transversally with respect to the crown of the tire casing.

8. The device according to claim 1, wherein at least part of the electronic device is located radially inwardly with respect to the crown of the tire casing.

9. The device according to claim 1, wherein the active part of the at least one bending sensor has an external surface connected to a radially interior surface of the crown of the tire casing.

10. The device according to claim 1, wherein the at least one bending sensor is a passive and resistive sensor.

11. The device according to claim 1, wherein the at least one bending sensor is an active and piezoelectric sensor.

12. The device according to claim 1, wherein the electronic device includes at least one sensor, for measuring parameters of the mounted assembly, selected from the group consisting of a temperature sensor, a pressure sensor and an accelerometer.

13. The device according to claim 1, wherein the electronic device includes at least one radiofrequency transmitting device.

14. The device according to claim 1, wherein the electronic device includes at least one radiofrequency receiving device.

* * * * *